United States Patent [19]
McLaughlin et al.

[11] 3,720,910
[45] March 13, 1973

[54] HIGH RESOLUTION TELEMETRY FOR RANDOM PULSE OUTPUTS

[75] Inventors: Charles R. McLaughlin; Jerry B. West, both of Dallas, Tex.

[73] Assignee: Century Geophysical Corporation, Tulsa, Okla.

[22] Filed: Feb. 25, 1970

[21] Appl. No.: 13,930

[52] U.S. Cl. ............... 340/18 R, 307/220, 325/141, 328/41, 328/44, 331/18, 340/18 P, 340/168 R, 340/361
[51] Int. Cl. .................................................. G01v 1/40
[58] Field of Search......178/6 B, 6 W, 6 R; 340/18 P, 340/359, 361; 328/41, 39, 44; 325/141; 331/18

[56] References Cited

UNITED STATES PATENTS

| | | | |
|---|---|---|---|
| 3,435,224 | 3/1969 | Zemanek, Jr. | 340/18 P |
| 3,504,290 | 3/1970 | Earle | 328/41 |
| 2,802,951 | 8/1957 | Seevers | 340/18 P |
| 3,559,163 | 1/1971 | Schwartz | 340/18 P |

*Primary Examiner*—Samuel Feinberg
*Assistant Examiner*—H. A. Birmiel
*Attorney*—Richards, Harris & Hubbard

[57] ABSTRACT

A system for accommodating random pulses having frequencies above the passband of the pulse transmission channel includes a first accumulating register into which the random pulses are fed. A second accumulator register accumulates the output pulse count of the system, and a comparator produces an output level when the counts stored in first and second registers are at a predetermined relation to one another. A synchronizing clock has an output pulse rate within the passband of the pulse transmission channel and controls the output from the comparator according to the pulse rate, such that pulses applied to the pulse transmission channel are uniformly spaced apart at a frequency within the passband of the transmission channel.

14 Claims, 5 Drawing Figures

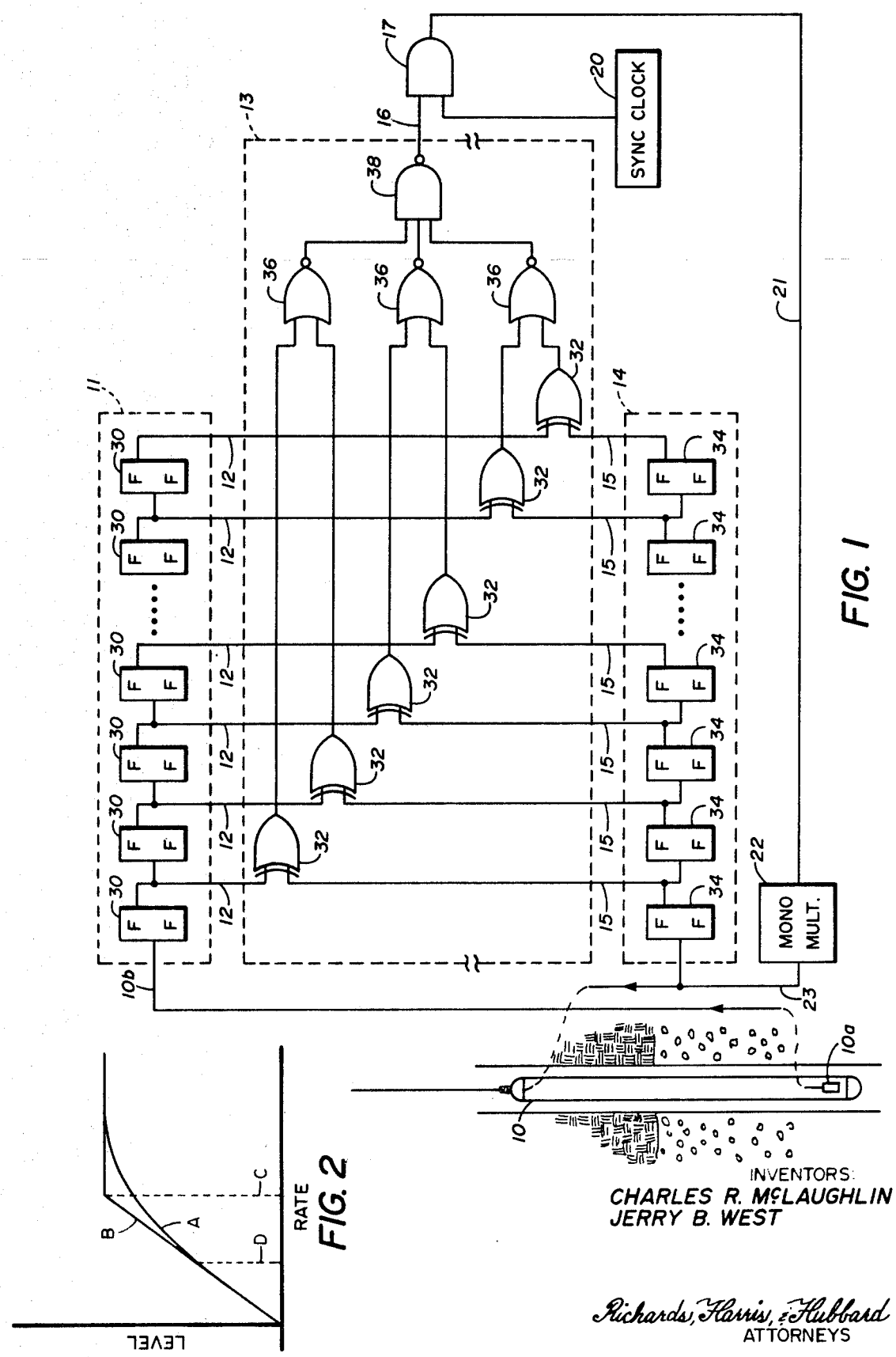

3,720,910

HIGH RESOLUTION TELEMETRY FOR RANDOM PULSE OUTPUTS

FIELD OF THE INVENTION

This invention relates to telemetry, and more particularly to a method and system for enhancing pulse pair resolution in a well logging telemetry system that is bandwidth limited by the logging cable.

THE PRIOR ART

Radioactive well logging is commonly practiced wherein a radiation sensitive detector is lowered down a well and electrical signals generated by the detector in response to sensed radiation are telemetered uphole via a logging cable to a recording apparatus. Such radiation detectors, and in particular, commonly used gamma ray detectors, often generate output pulses at a rate exceeding the inherent passband characteristics of the logging cable extending uphole. For instance, a typical 3,000 foot logging cable will generally have a limited bandwidth less than about 100 kc at the upper end. However, output counting rates of conventional gamma ray detectors will often extend substantially above this level, thereby resulting in loss of resolution for the logging tool. Moreover, problems have heretofore arisen in gamma ray logging with the utilization of ionization-type gamma ray detectors due to the occurrence of substantial "dead time" in the recorded output.

SUMMARY OF THE INVENTION

In accordance with the present invention, random pulses are input into a first storage register, the output of which is fed to a comparator unit. The output of the comparator unit is fed into a gate circuit which is controlled by the output of a clock having a predetermined output frequency. The output from the gate is applied to a remote utilization station and is also applied to the input of a second storage register. The count stored within the second storage register is also applied to the comparator unit such that the comparator unit produces an output only when the counts in said first and second registers bear a predetermined relationship to one another.

In accordance with a more specific aspect of the invention, the random pulse output from a radioactive logging tool is applied to the input of a first binary register. The count stored on the first binary register is fed into an input of a comparator unit, and the output of the comparator unit is fed through a gate, the operation of which is controlled by the output of a clock. The output frequency of the clock is within the frequency passband of the uphole logging cable connected to the radioactive logging tool. The output of the gate is applied through a monostable device to the well logging cable and also to the input of a second binary register. The output of the second binary register is fed into a second input of the comparator unit. The comparator unit generates a prescribed output when the binary count stored in the first and second binary registers bear a predetermined relationship to one another.

DESCRIPTION OF THE DRAWINGS

FIG. 1 is a block diagram of one embodiment of the invention;

FIG. 2 is a graph illustrating the radiation level versus the pulse rate of the present system;

FIGS. 5a–c illustrate the operation of the pulse code modulation circuit.

DESCRIPTION OF THE PREFERRED EMBODIMENTS

Figure 3:
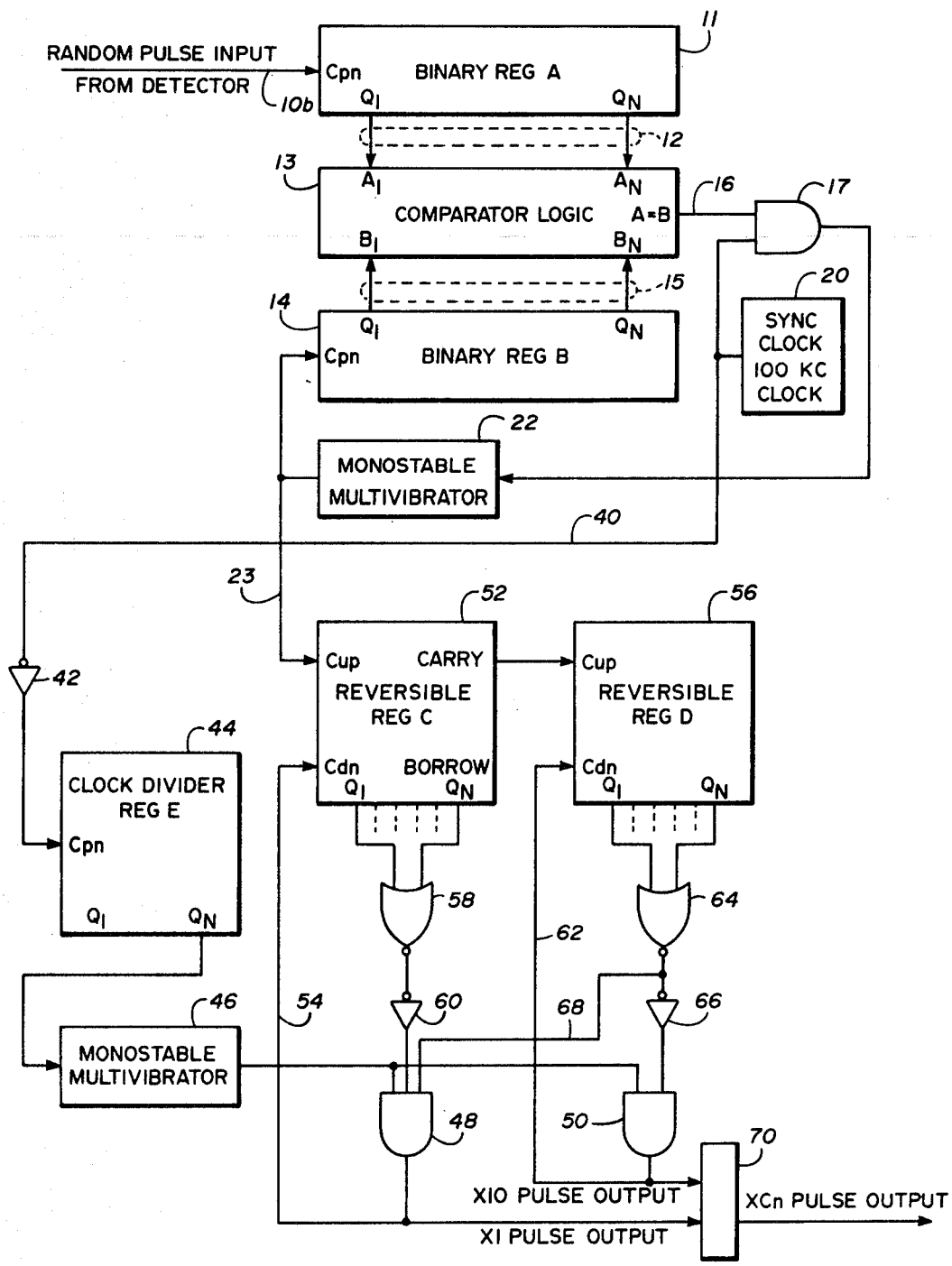
FIG. 3 is a block diagram of another embodiment of the invention.

Referring to FIG. 1, a system is shown for enhancing pulse pair discrimination in a system such as employed in the logging of oil wells where logging cables inherently are limited in bandwidth. In radioactive logging, it is often desirable to be able to discriminate between pulses which may occur at rates as high as about 10 megacycles, whereas the best of cables available, and in particular cables normally in use, may have a maximum bandwidth of up to 100 kilocycles. The present invention is directed to accommodating the above-indicated logging pulse rates on cables of such limited bandwidth.

More particularly, as shown in FIG. 1, a conventional downhole radioactivity logging tool 10 includes a Geiger counter or a scintillation counter 10a which applies output pulses via an output channel 10b to an accumulator register 11. The accumulator register 11 in one embodiment of the invention was provided with twelve bits of storage. The register 11 is connected by way of channels 12 to the input of a comparator 13. Similarly, a second accumulator register 14 is connected by way of channels 15 to the comparator 13. The output of comparator 13 is connected by way of line 16 to an AND gate 17. Comparator 13 provides a true output voltage level or state when the count in accumulator 11 does not equal the count in accumulator 14. When the counts in both accumulators are equal, then the voltage level on line 16 is false or zero.

A synchronizing clock 20 is connected to a second input on the AND gate 17. The clock 20 has an output pulse rate set at or near the maximum bandwidth that can be passed by a log cable. In one embodiment, a 3,000 foot log cable of conventional configuration was employed with a clock 20 having a pulse rate of 88,000 cycles per second. The output of the AND gate 17 is connected by way of channel 21 to the input of a monostable multivibrator 22, whose output is connected by way of channel 23 to the input of accumulator register 14 and to the logging cable extending uphole.

The monostable multivibrator 22 is connected so as to respond to output pulses from AND gate 17, as generated by clock 20, and more particularly only to the trailing edges of the pulses.

The binary registers 11 and 14 may comprise any suitable register for storing the required binary count. In one embodiment of the invention, each of the registers utilized 12 flipflop circuits 30. Suitable binary registers utilizing series connected flipflops are the SN7493N registers manufactured and sold by Texas Instruments Incorporated. The output of each flipflop circuit 30 is coupled into the input of the next adjacent flipflop and also to the input of an exclusive OR gate 32. Similarly, the binary register 14 comprises twelve flipflops 34 connected in series, with the output of each flipflop being coupled to another input of the respective OR gate 32. A suitable gate for use as the exclusive OR gate 32 is the MC1812P gate manufactured and sold by the Motorola Company. The outputs of adjacent errors of the gates 32 are fed to NOR gates 36.

Suitable NOR gates for use with the invention are the SN7402N gates manufactured and sold by Texas Instruments Incorporated. The outputs of gates 36 are fed to a NAND gate 38, the output of which is applied via lead 16 to AND gate 17. A suitable NAND gate for use with the invention is the SN7430N gate manufactured and sold by Texas Instruments Incorporated. It will be understood that various types of logic configurations could be utilized for the binary registers 11 and 14, as well as for the comparator logic unit 13, as long as an output signal is generated when the count contained in register 11 is different from the binary count contained in register 14.

In operation, the system is initially energized and if the counts in registers 11 and 14 differ one from the other, then the state on line 16 permits the clock pulses periodically to actuate the multivibrator 22 thus applying pulses to the uphole cable via channel 23. This action will continue until the count in the two registers is equal. The present system can thus accept large slugs of pulses and output the pulses as a synchronously spaced pulse train within the bandwidth of the transmission line.

From the foregoing, it will be seen that the present system operates to store the pulses that are generated on input line 10b at a high repetition rate of random character, and to produce in response thereto a corresponding number of synchronously spaced pulses on output channel 23. This is true so long as the pulse rate on line 10b does not exceed the clock rate for a period of time sufficient to overload the register 11 or to introduce into register 11 a series of counts such that the count in register 11 overtakes the count in register 14. The system operates such that in all cases the average rate input of pulses on line 10b approaches, but does not and will not exceed the rate of pulse generation by clock 20.

Referring to FIG. 2, the curve A illustrates the pulse rate versus radiation level of a conventional radiation logging system without the present invention. Due to the Poisson distribution of the radiation detector output, theoretically curve A should be a linear function up to rate C, which is the maximum bandpass limit of the uphole cable. However, the pulses tend to "pileup" on the cable, and the resulting pulse loss problems cause the curve A to depart from a linear function at rate D. However, the present invention provides a curve B which preserves the linearity of the radiation information until the present clock frequency is reached at point C.

Referring to FIG. 3, another embodiment of the invention is illustrated wherein the binary registers 11 and 14 are connected to comparator logic 13 in the same manner as that previously described. The output from logic unit 13 is applied through lead 16 to the AND gate 17, the output of which is fed through the monostable multivibrator 22 and out on the channel 33. The output of monostable multivibrator 22 is fed into the input of the binary register 14 in the manner previously described. Sync clock 20 in this instance provides a 100 kc output which is fed to the AND gate 17. Additionally, the output of the clock 20 is fed via lead 40 through an inverter 42 to the $C_{pn}$ input of a clock divider register 44.

Register 44 divides the output of clock 20 by a prescribed amount, in this instance, by ten, and feeds the resultant output through a monostable multivibrator 46. The output of multivibrator 46 is fed to the inputs of AND gates 48 and 50. The output on channel 23 is applied to the $C_{up}$ input of a reversible register 52. Additionally, the output from gate 48 is applied via lead 54 to the $C_{dn}$ input of register 52. Suitable registers for use as registers 52 and 56 in the invention are the DM8560 registers manufactured and sold by National Semiconductor Inc. The carry output of the register 52 is fed to the $C^{up}$ input of a reversible register 56. The $Q_l$ through $Q_n$ outputs (only two of which are shown) of the register 52 are fed into a NOR gate 58, the output of which is fed through an inverter 60 to an input of AND gate 48.

The output of AND gate 50 is fed via lead 62 to the $C_{dn}$ input of the reversible register 56. The $Q_l$ through $Q_n$ outputs of the register 56 are fed through a NOR gate 64 and through an inverter 66 to the input of gate 50. The output of gate 64 is also fed via lead 68 to an input of the AND gate 48. The output of AND gates 48 and 50 are fed into an encoder circuit 70 which generates the desired $XC_n$ pulse output.

In operation of the circuit shown in FIG. 3, the AND gate 17 online 16 permits the clock pulses from clock 20 to periodically actuate the multivibrator 22, thus applying the pulses to the channel 23 which feeds to the reversible register 52. Additionally, the clock output from clock 20 is fed via lead 40 and through the inverter 42 to the input of the divider register 44.

The pulses applied to the clock divider 44 are divided by ten and are fed to the monostable multivibrator 46. The output of the multivibrator 46 is a 10kc pulse train which is fed to the inputs of gates 48 and 50. The register 52 captures the input pulses upon channel 23, and when register 52 is full, the pulses spill out into the register 56.

The outputs of gates 58 and 64 are false when the respective registers 52 or 56 obtain a pulse count. The X10 pulse output from the gate 64 locks off, or negates, the output from register 52 if a count is contained in the register 56. This locking off occurs due to the application of the false output of gate 64 to the input of gate 48 to prevent an output therefrom when a count is contained in register 56. The false output from gate 64 is inverted by the inverter 66 and applied to gate 50. Thus, when an output pulse is received from the monostable multivibrator 46, gate 50 provides an output pulse to the encoder 70. This output pulse is representative of 10 input pulses applied on channel 23. THe output pulses from gate 50 continue until the stored count in register 56 is depleted. The output from gate 50 is applied to the $C_{dn}$ input of the register 56 in order to decrement the count of the register each time a X10 output pulse is generated and fed to the encoder 70.

When the count in the register 56 is depleted, the lock-off false signal applied from gate 64 to gate 48 is eliminated, and thus pulses are generated through gate 58. These pulses are fed through inverter 60 and gate 48 upon the occurrence of each pulse from the multivibrator 46, as long as a count is stored in the register 52. After the generation of each pulse from gate 48, a pulse is fed via lead 54 to the $C_{dn}$ terminal of the register 52 in order to decrement the register one count. Pulses appearing as an output from gate 48 are thus representative of each pulse fed into the system from channel 23. An important aspect of the invention is that each of the registers 52 and 56 may continuously store and carry $C_{up}$ pulses, with no interference occurring between the registers due to the fact that the incrementing and decrementing pulses applied to the registers are clock synchronous.

It may thus be seen that a series of pulses are applied from gate 48 to the encoder 70, with each positive representative of the pulse being fed from channel 23. Additionally, a series of pulses are generated by the output of gate 50 and are fed into the encoder 70, with each of the pulses being representative of 10 pulses being applied to channel 23. The encoder 70 may comprise any one of a number of known encoders, such as a phase shift encoder or a pulse code modulator system. The encoder encodes the input signals applied thereto in such a manner as to reduce the required bandwidth necessary for handling the information provided via channel 23. The overall effect of the system shown in FIG. 3 is that the necessary bandwidth of the system is first reduced to in the range of 100kc by the derandomizing nature of the system shown in FIG. 1. The remainder of the circuitry shown in FIG. 3 then serves essentially as an additional bandwidth expanding system for the uphole transmission cable of the system.

Figures 4, 5:
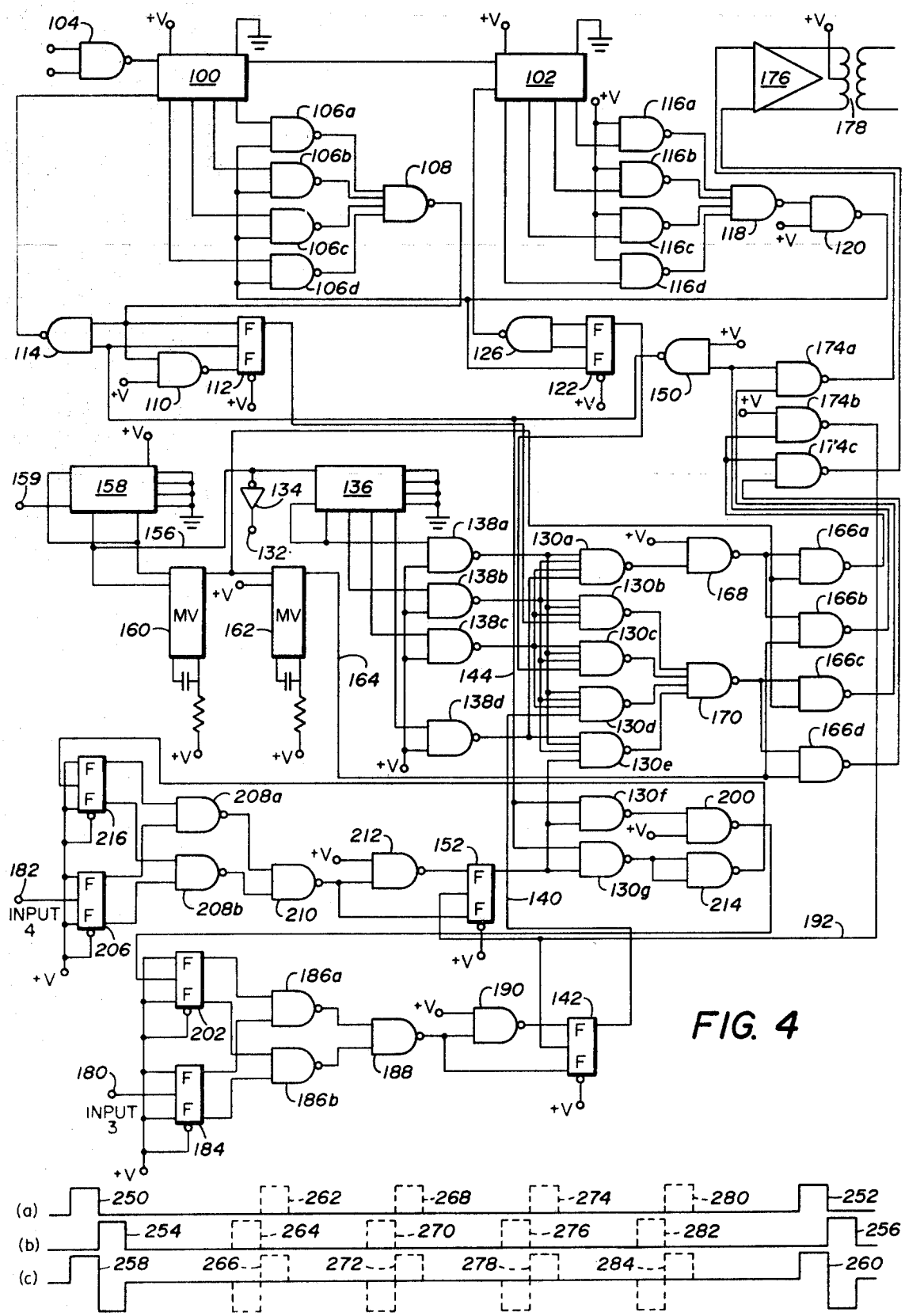
FIG. 4 is a block diagram of yet another embodiment of the invention.

FIG. 4 illustrates in schematic detail a third embodiment of the invention embodying aspects of the system shown in FIG. 3 along with the preferred encoder system. A reversible register 100 corresponds to register 52 shown in FIG. 3, while a reversible register 102 corresponds to the register 56 shown in FIG. 3. The output pulses from the derandomizer circuitry described with respect to FIG. 1 are fed through a NAND gate 104 to the input of the register 100. Register 100 stores up to 10,000 pulses/sec, after which the pulses spill over into the register 102 in the manner previously described. The output from register 100 is connected to NAND gates 106a–d, the outputs of which are connected into a four input NAND gate 108. The output of gate 108 is fed to an input of a NAND gate 110, the output of which is connected to operate a flipflop 112. The output from gate 108 is also fed through a gate 114, the output of which is connected to the decrement terminal of the register 100.

In a somewhat similar manner, the outputs of register 102 are connected through NAND gates 116a–d to a NAND gate 118. The output of gate 118 is connected through a NAND gate 120 which in turn is connected to a flipflop circuit 122. The output of gate 120 is also connected into the inputs of each of the gates 106a–d. Flipflop 122 is connected to the inputs of a NAND gate 126, the output of which is connected to the decrement terminal of the register 102.

The operation of the registers 100 and 102 are similar to that previously described, wherein the flipflop 112 generates a series of pulses representative of each pulse transmitted through the gate 104, while flipflop 122 generates pulses representative of a prescribed multiple of the pulses fed through gate 104.

The output of flipflop 112 is fed into the input of a NAND gate 130b, while the output of the flipflop 122 is fed into the NAND gate 130c. The 100kHz clock input is applied to terminal 132 and is applied through an inverter 134 to the input of a X10 decade divider or counter 136. This decade divider corresponds to the divider 44 shown in FIG. 3. The outputs from the divider 136 act as logic synchronizing signals and are fed through NAND gates 138a–d, the outputs of which are respectively connected to inputs of NAND gates 130a–e.

NAND gate 130d is also connected via lead 140 to the output of a flipflop 142, in order to receive auxiliary data pulses in a manner to be subsequently described. Additional NAND gates 130f–g have inputs connected via lead 144 to the input of NAND gate 114 and also to NAND gate 150. An input of gate 130g is also connected to the output of a flipflop 152 in order to receive additional auxiliary data in a manner to be subsequently described.

The clock pulses applied at terminal 132 are also fed via lead 156 to the decade counter divider circuit 158. Terminal 159 receives a 1MHz input clock signal. The output of the counter 158 is applied to a monostable multivibrator 160 and a monostable multivibrator 162. The output of multivibrator 162 is applied via lead 164 to the inputs of NAND gates 166c–d. The output of gate 130a is fed through a NAND gate 168 to the input of a NAND gate 166a. The outputs of gates 130b–e are connected through a NAND gate 170 to the inputs of gates 166c–d. An input of gate 166d is commonly tied to an input of gate 166b. The outputs of gates 166a–d are fed to NAND gates 174a–c. The outputs of gates 174a and 174c are fed to a driver amplifier 176 which provides an output chain of pulses through the transformer 178 to the uphole transmission cable.

Auxiliary inputs may be fed into the system at input terminals 180 and 182. These auxiliary inputs may, for instance, comprise outputs from resistivity measuring devices or from caliper devices also disposed downhole with the radioactivity measuring device of the invention. The present system enables the transmission of such auxiliary data uphole without increasing the bandwidth requirements of the system. The input signals fed through terminal 180 are fed to a flipflop 184, the outputs of which are connected to the inputs of NAND gates 186a–b. The outputs of NAND gates 186a–b are connected to the inputs of the gate 188, which is connected directly to the flipflop 142 and also through a gate 190 to the flipflop 142. The output from flipflop 142 is applied via lead 140 to an input of gate 130d.

Gate 130f is connected to the input of NAND gate 200, the output of which is connected to the input of a flipflop 202. The outputs of flipflop 202 are fed to the inputs of the NAND gates 186a–b. The input auxiliary signal applied to input terminal 182 is fed to a flipflop circuit 206, the outputs of which are connected to NAND gates 208a–b. The outputs of gates 208a-b are fed through a NAND gate 210 and a NAND gate 212 to the flip-flop 152. Gate 130g is connected to a NAND gate 214, the output of which is connected to the input of a flipflop 216. The outputs of flipflop 216 are applied to the inputs of gates 208a–b.

In the operation of the circuit, X1 and X10 input signals are applied from the registers 100 and 102 to ones of the logic control gates 130a–e in the manner previously described. Additionally, the auxiliary three and four inputs are applied through terminals 180 and 182 to ones of the logic control gates 130a–g. The clock signals applied to terminal 159 and terminal 132 are utilized to synchronize the logic circuitry in order to generate a series of pulse code modulated output signals through the output of the driver amplifier 176.

FIGS. 5a–c illustrate the operation of the pulse code modulation circuit. FIG. 5a illustrates a pair of positive going (or logic one) output pulses 250 and 252 spaced apart by a predetermined period, which in the preferred embodiment will be approximately 0.1/msec. The output pulses 250 and 252 define the data frame of the invention in which the various data pulses will be presented. The output pulses 250 and 252 appear at the output of gate 174a and are applied to one input of the driver amplifier 176. Positive pulses 254 and 256 are generated from gate 174c and are applied to the second input of the driver amplifier 176. The leading edge of the pulses 254 and 256 coincide with the trailing edge of the pulses 250 and 252. The resulting output from the driver amplifier 176 is illustrated in FIG. 5c, wherein a pair of spaced apart positive and negative going waveforms 258 and 260 are illustrated as defining the data frame on the invention.

A variety of data information may be transmitted uphole by the system by utilizing various time slots within the data frame defined by the waveforms 258 and 260. For example, the pulses 262 and 264 may be generated respectively from the outputs of gates 174 and 174c in response to pulses from the register 102 in the manner previously described. Thus, a negative and positive going waveform 266 may be generated from the amplifier 176 which is indicative of the X10 pulse output previously described with respect to FIG. 3. Pulses 268 and 270 may be generated in response to output pulses from the register 100. Thus, the negative and positive going waveform 272 which is generated from the amplifier 176 for transmission uphole is representative of the X1 pulse output previously described with respect to FIG. 3.

Pulses 274 and 276 may be generated by the system in response to the Input 3 auxiliary signals, thereby generating output waveform 278 to provide information regarding the auxiliary data. Likewise, pulses 280 and 282 can be generated by the system indicative of the Input 4 auxiliary data, in order to provide an output pulse 284 indicative of the auxiliary data for uphole transmission.

It will thus be seen that the present invention provides a means of encoding the generated downhole signals in such a way as to reduce the required bandwidth for transmission of the data uphole. The output pulses of the invention may be inserted in respective time slots to provide an accurate and improved pulse transmission system. Decoding is performed upon the transmitted signals uphole by conventional decoding apparatus. The time position of the pulses with respect to the defined data frame indicates the type of information being decoded.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A method of accommodating random pulses generated at frequencies above the passband of a well logging transmission channel comprising:
    storing indications of the random pulses,
    generating pulses only at frequencies within said passband of said transmission channel in response to the stored indications,
    storing said generated pulses,
    encoding the stored pulses to reduce the required bandwidth for transmission thereof, and
    transmitting the encoded pulses uphole via said transmission channel.

2. The method of claim 1 wherein said step of encoding comprises:
    generating first output pulses in response to a prescribed low average number of pulses, and
    generating second output pulses in response to an average number of input pulses above said low number.

3. A method of pulse transmission comprising:
    storing first bits in response to random pulses,
    generating pulses at a uniform rate in response to the stored bits,
    storing second bits for every generated pulse,
    enabling generation of said pulses only when the number of said stored first and second bits bear a predetermined relationship to one another,
    storing the generated pulses,
    encoding the stored pulses to reduce the required bandwidth for transmission thereof, and
    transmitting the encoded pulses to a remote location.

4. The method of claim 3 wherein said step of encoding comprises:
    generating first output pulses in response to a prescribed low average number of pulses, and
    generating second output pulses in response to an average number of input pulses above said low number 5. A system for pulse transmission comprising:
    first means for storing bits in response to generation of random first pulses,
    means for generating second pulses at a uniform rate in response to the stored bits,
    second means for storing bits for each said second pulse,
    means for enabling generation of said second pulses only when the number of said stored bits in said first and second means bear a predetermined relationship to one another,
    register means for storing said second pulses, and
    encoder means for encoding said stored second pulses in order to reduce the required bandwidth for transmission thereof.

6. The system of claim 5 wherein said encoder means comprises:
    means for generating first output pulses when the number of said stored pulses are below a prescribed magnitude,
    means for generating second output pulses when the number of said stored pulses are above the prescribed magnitude, and means for transmitting said first and second output pulses in a predetermined time sequence.

7. A system for accommodating random pulses having frequencies above the passband of a well logging pulse transmission channel which comprises:
   a. first and second accumulator registers,
   b. circuit means for applying said pulses to said first register,
   c. a comparator for producing an output level when the pulses stored in said first and second registers bear a predetermined relationship to each other,
   d. gate means for performing an AND function connected at one input to the output of said comparator,
   e. a synchronizing clock connected to the second input of said gate means, said clock having a pulse rate within said passband,
   f. pulse generating multivibrator means connected at its output to the input of said second register and connected at its input to the output of said gate means and adapted to be actuated in response to a predetermined portion of the output clock pulses passed by said gate means, and
   g. circuit means for connecting the output of said pulse generating means to said pulse transmission channel.

8. A system for accommodating random pulses having frequencies above the passband of a pulse transmission channel which comprises:
   first and second accumulator registers,
   circuit means for applying said pulses to said first register,
   a comparator for producing an output level when the pulses stored in said first and second registers bear a predetermined relationship to each other,
   gate means connected at one input to the output of said comparator,
   a synchronizing clock connected to the second input of said gate means, said clock having a pulse rate within said passband,
   pulse generating means connected at its output to the input of said second register and connected at its input to the output of said gate means and adapted to be actuated in response to the output clock pulses passed by said gate means,
   circuit means for connecting the output of said pulse generating means to said pulse transmission channel,
   bandwidth reduction circuitry connected between said circuit means and said pulse transmission channel,
   said bandwidth reduction circuitry including means for storing the output signals from said pulse generating means, and
   encoder means for encoding the stored signals prior to transmission through said pulse transmission channel.

9. The system of claim 8 wherein said encoder means comprises:
   means for generating first output pulses when said stored pulses are below a prescribed magnitude, and
   means for generating second output pulses when the number of said stored pulses are above the prescribed magnitude.

10. The system of claim 8 wherein said encoder multiplexes the information from said stored pulses with auxiliary information.

11. A system for pulse transmission comprising:
   a first reversible register for accumulating input pulses,
   a second reversible register connected in series with said first register,
   first and second gate means connected to the outputs of said first and second registers,
   clock means for providing clock pulses to the inputs of said gate means, wherein the output of said first gate means is representative of a first prescribed number of input pulses and the output of said second gate means is representative of a second prescribed number of input pulses, and
   encoder means for encoding and transmitting the outputs of said first and second gate means.

12. The system of claim 11 wherein the output from each gate means is also connected back to the respective register for decrementing said register.

13. The system of claim 11 wherein said encoder generates a time series of pulses, pulses in one prescribed time slot being representative of a first magnitude of pulses stored in said first register and pulses in a second prescribed time slot being representative of a second magnitude of pulses stored in said second register.

14. The system of claim 13 wherein said encoder generates pulses in additional time slots representative of auxiliary information.

* * * * *